G. A. Lloyd,
Lubricating Sleeve.
No. 98,172. Patented Dec. 21, 1869.
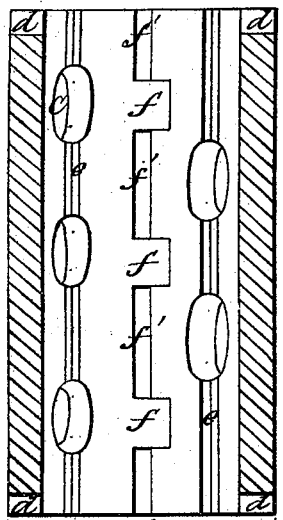
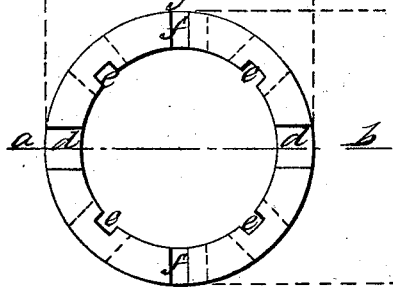
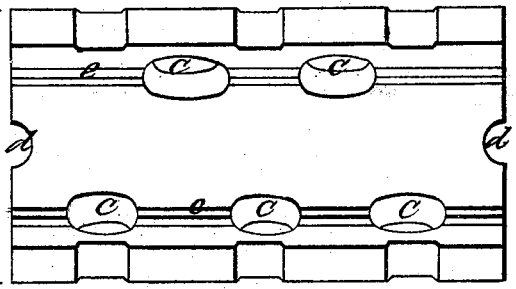
Witnesses:
David R. Smith
H. A. Schreiber
Inventor:
G. A. Lloyd
Assor to himself & A. Rosenfield
By his Atty C. W. M. Smith

United States Patent Office.

GEORGE A. LLOYD, OF SAN FRANCISCO, CALIFORNIA, ASSIGNOR TO HIMSELF AND ANTHONY ROSENFIELD.

Letters Patent No. 98,172, dated December 21, 1869.

IMPROVEMENT IN LUBRICATING-SLEEVES.

The Schedule referred to in these Letters Patent and making part of the same.

*To all whom it may concern:*

Be it known that I, GEORGE A. LLOYD, of the city and county of San Francisco, State of California, have invented an Improved Lubricating-Sleeve; and I do hereby declare that the following is a full, clear, and exact description of the same, reference being had to the accompanying drawings, and to the letters marked thereon.

My invention relates to certain improvements in that class of lubricating-sleeves and bushings to axles, shafting, and wheels having openings or perforations, and consists in dividing the sleeve longitudinally, and providing lugs to hold it in position, also, to lubricating the collars or end bearings, and connecting the perforations by means of grooves.

In the drawings that form a part of this specification—

Figure 1 is a longitudinal section on the line $a\,b$ of fig. 3.

Figure 2 represents an elevation of one-half of the sleeve.

Figure 3 is an end view of the sleeve.

Like letters refer to like parts.

To enable others skilled in the art or science to which it most nearly appertains, to make and use my invention, I will proceed to describe fully its construction and operation.

I construct my sleeve or bushing with holes or openings $c$, which are connected by inner grooves $e$, which may be made lengthwise or at right angles with the openings.

End recesses, $d$, are also made in the ends of the sleeves, so that the collars or flanges of the shaft may be lubricated.

The sleeve is divided longitudinally in halves, and, when in operation, is kept in position by collars or bearings at the end of the shaft, and the lugs $f\,f$, which lugs fit in depressions on the opposite half of the sleeve.

Between the lugs are spaces $f'\,f'$, through which a more complete lubrication is effected.

My device being constructed in halves, as shown, can be used under circumstances that would prevent its application otherwise, as, for instance, on journals, shaftings, or axles having collars or flanges.

When in use, the perforations, spaces, and recesses are all filled with tallow, or some other lubricating substance, solid at ordinary temperature, and which will effectually lubricate the parts when cold, and if heat should be generated by friction, the quantity of tallow melted will correspond with the amount of heat generated, and thus increase or diminish the supply, as is required.

The sleeve being recessed at the ends, the collars or end bearings will be acted upon in the same manner as the other bearing-surfaces, and should the sleeve become fixed to the shaft, it would be still free to revolve in the wheel.

The bushing runs independent on the axle, and if by heating or other causes it should bind, the wheel revolves around the bush.

The inner grooves $e$ serve to convey and distribute the melted lubricating-material equally to all parts of the surfaces of the journal.

By this means the lubrication is much more complete and perfect upon the bearing-surfaces, and great security is had against sand and grit that might otherwise find its way to the wearing parts, which is collected and retained in the grooves, recesses, and spaces and perforations.

Having thus described my invention, I do not claim, broadly, a sleeve or bushing; but

What I do claim, and desire to secure by Letters Patent, is—

1. Dividing the sleeve longitudinally, and holding it in position, when in operation, by means of the lugs and recesses $f\,f$, substantially as described.

2. The end recesses $d\,d$, and the spaces $f'\,f'$, in a lubricating-sleeve, as set forth.

In testimony whereof, I have hereunto set my hand and seal.

G. A. LLOYD. [L. S.]

Witnesses:
C. W. M. SMITH,
DAVID P. SMITH.